– – –

United States Patent Office 3,152,121
Patented Oct. 6, 1964

3,152,121
20-KETALS OF 3-HYDROXY-5β-PREGNAN-20-ONE
William J. Wechter, Kalamazoo, Mich., assignor to The
Upjohn Company, Kalamazoo, Mich., a corporation of
Delaware
No Drawing. Filed Mar. 16, 1962, Ser. No. 180,322
2 Claims. (Cl. 260—239.55)

This invention is concerned with novel steroid oximes and alkylene ketals, and more particularly with the 20-mono-oximes and 20-mono-alkylene ketals of 3(α and β)-hydroxy-5β-pregnan-20-one and the corresponding 3-acylates thereof.

The novel compounds and processes of the present invention are illustratively represented by the following formulae:

(1)

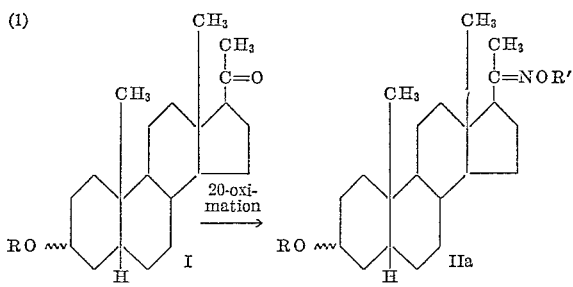

wherein R is selected from the group consisting of hydrogen and the lower-acyl radical of a hydrocarbon carboxylic acid containing from one to eight carbon atoms, inclusive; R' has the same meaning as R and in addition represents a lower-alkyl radical containing from one to eight carbon atoms, inclusive; ~ is a generic expression denoting α and β bonds and mixtures thereof;

2)

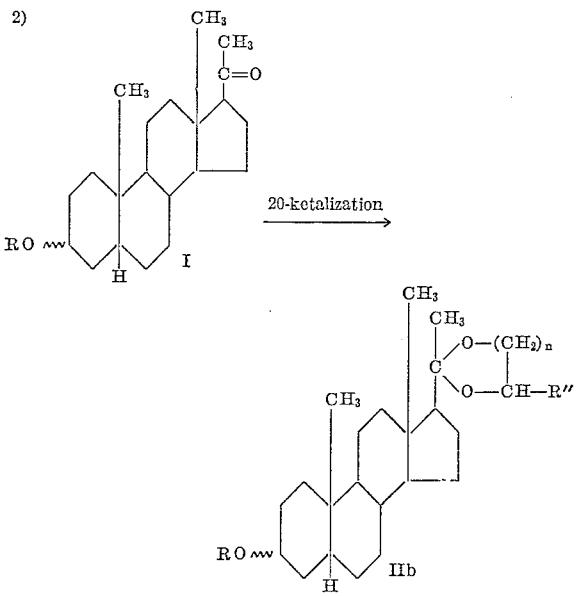

wherein R and ~ have the same meanings as above; $n$ is an integer selected from the group consisting of one and two; R''' is selected from the group consisting of hydrogen and a lower alkyl radical containing from one to six carbon atoms, inclusive.

In this specification and claims, the terms =NOH, =NOR', =NOR' and =NOR'' (wherein R'' is a lower-alkyl radical containing from 1 to 8 carbon atoms, inclusive) when attached to the 20-carbon atom of the steroid nucleus denote the 20-anti form, the 20-syn form and mixtures thereof.

The compounds of the present invention, i.e., 3(α and β)-hydroxy-5β-pregnan-20-one 20-oxime (IIa), the corresponding 20-lower-acyloximes (IIa) and 20-lower-alkyloximes (IIa) thereof, and 3(α and β)-hydroxy-5β-pregnan-20-one 20-alkylene ketals (IIb), are central nervous system depressants, useful as tranquilizers, anti-convulsants, muscle relaxants, hypotensive agents and sedatives in the treatment of nervous disorders, hypertension and related illnesses in valuable domestic animals.

The 20-mono-oxime and 20-mono-alkylene ketal compounds of the present invention can be prepared and administered to mammals, birds, and animals in a wide variety of oral and parenteral dosage forms, singly or in a mixture with other coacting compounds. They can be associated with a carrier which can be a solid material or liquid, in which the compound is dissolved, dispersed or suspended. The solid composition can take the form of tablets, powders, capsules or the like, preferably in unit dosage forms for simple administration or precise dosages. In such compositions, for the 20-mono-oximes, either the 20-syn or 20-anti isomers or equilibrium mixtures thereof can be used.

The 20-mono-oxime compounds (IIa) of the present invention are prepared from their corresponding 20-keto compounds by 20-mono-oximation, i.e., by reaction with hydroxylamine or hydroxylamine mineral acid salts such as hydroxylamine hydrochloride. The starting materials employed in the process for preparing the novel 20-mono-oximes are 3β-hydroxy-5β-pregnan-20-one (I), 3α-hydroxy-5β-pregnan-20-one (I) and their corresponding 3-acylates (I).

The 20-mono-oximation process of the present invention comprises treating a compound selected from one of the starting materials represented by Formula I, above, with a mineral acid salt of hydroxylamine such as hydroxylamine hydrochloride or hydroxylamine sulfate in a suitable solvent such as (1) an alkanol, for example methanol, ethanol, propanol, isopropanol, butanol or (2) a tertiary amine, for example, pyridine, collidine, N,N-dimethylaniline and the like, or preferably (3) an alcohol in the presence of a basic reagent such as a tertiary amine, sodium or potassium hydroxides, carbonates or acetates, to give the corresponding 3-mono-oxime. In carrying out this 20-oximation process, an excess of hydroxylamine salt usually from two to six molar equivalents is preferably employed. Alternatively, hydroxylamine itself can be used in place of the hydroxylamine salt and base.

The 20-mono-oximation reaction is preferably carried out at 20 to 120° C., and conveniently at the reflux temperature of the reaction mixture. Under these conditions the reaction time is usually from 15 minutes to 8 hours. Both higher and lower temperatures and shorter and longer reaction times are operative, the lower temperature usually requiring a correspondingly longer reaction time.

The 20-mono-oximes represented by Formula IIa thus produced, can be isolated from their reaction mixtures by conventional methods, for example, when a water-miscible solvent is used, by pouring the reaction mixture into water and separating the resultant precipitate by filtration. Additional purification of the product can be accomplished by conventional methods, for example, by elution chromatography from an adsorbent column with a suitable solvent or mixture of solvents such as, acetone, methanol, dilute methanol, ethanol, ether, methylene chloride, Skellysolve B (hexanes); also by gradient elution chromatography from an adsorbent column with a suitable mixture of solvents, such as, methylene chloride-Skellysolve B, acetone-Skellysolve B, and the like.

When mixtures of 20-syn and 20-anti isomers are obtained in the above-disclosed 20-mono-oximation process or by equilibration of these products, they can be separated by procedures known in the art for isolating components of mixtures of geometrical isomers, for example, by fractional crystallization, chromatography, selective leaching, or a combination of these methods, as will be evident to those skilled in the art.

The 20-mono-alkylene ketal compounds (IIb) of this invention are prepared from their corresponding 20-keto compounds (I) by 20-mono-ketalization, i.e., by reaction with an alkanediol of the formula

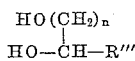

wherein $n$ is an integer selected from the group consisting of one and two and R''' is selected from the group consisting of hydrogen and a lower-alkyl radical containing from one to six carbon atoms, inclusive, e.g., methyl, ethyl, propyl, isopropyl, butyl, 1-methylpropyl, amyl, hexyl, etc., the 1,2- and 1,3-alkylene ketals being preferred. The ketal radicals of the aforementioned compounds for Formula IIb are cyclic ketal radicals of the formula

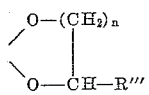

wherein $n$ and R''' have the same meanings as above.

The 20-mono-ketalization of 3($\alpha$ and $\beta$)-hydroxy-5$\beta$-pregnan-20-one (I) and the 3-acylates (I) thereof can be carried out in known manner as is disclosed, for example, in U.S. Patents No. 2,773,059 and No. 2,773,060. For example, in the 20-monoketalization, the steroid compounds are mixed with about two and one-half to 25 times the theoretical quanitity of the desired alkane-diol, preferably an alkane-1,2-diol or an alkane-1,3-diol corresponding to the above-described cyclic ketal radical. An organic nonreactive solvent is used, and the reaction temperature is maintained between about twenty and about 200 degrees centigrade. The time required for the reaction is not critical and can be varied between about one and about 24 hours, the length of time being somewhat dependent on the temperature, the ketalizing reagent and the catalyst employed.

As disclosed in the patents previously referred to, acid ketalizing catalysts such as a mineral acid or an organic sulfonic acid are used, e.g., ortho- and paratoluenesulfonic acids, naphthalenesulfonic acid, benzene-sulfonic acid, orthochloro-benzenesulfonic acid, hydrochloric acid, and sulfuric acid. The ketalizing reaction can be conducted in any organic solvent with which the reactants and products are nonreactive, such as, for example, benzene, toluene, xylene, methylene chloride, petroleum ether, diethyl ether, and the like; the water-azeotrope forming solvents are preferred.

The thus produced 20-mono-alkylene ketals (IIb) are isolated and purified in the same manner as disclosed above for the 20-mono-oximes represented by Formula IIa.

EXAMPLE 1

*3β-Hydroxy-5β-Pregnan 20-One 20-Oxime (IIa)*

Ten grams of 3β-hydroxy-5β-pregnan-20-one (I) (prepared in the manner of Marker et al., J. Amer. Chem. Soc. 59, 1841 [1937] was dissolved in 250 ml. of alcohol and heated at reflux with 3 g. of hydroxylamine hydrochloride and 4 g. of sodium acetate dissolved in 15 ml. of water and warmed for a period of about 1 hour. The reaction mixture was then diluted to a volume of about 500 ml. with water. The product was isolated after refrigeration and recrystallized from acetone to give 8.37 g. of material having a melting point of 178 to 180° C. Two recrystallizations from acetone yielded pure 3β-hydroxy-5β-pregnane-20-one 20-oxime (IIa) which melted at 177.0 to 178.5° C. and exhibited an infrared spectrum consistent with the anticipated structure of the desired compound.

*Analysis.*—Calcd. for $C_{21}H_{35}O_2N$: N, 4.20. Found: N, 4.36.

Example 2

*3β-Hydroxy-5β-Pregnan-20-One 20-Methoxime (IIa)*

Ten grams of 3β-hydroxy-5β-pregnan-20-one (I) is dissolved in 250 ml. of alcohol and heated at reflux with 4 g. of methoxylamine (methylhydroxylamine) hydrochloride and 5.5 g. of sodium acetate in 20 ml. of water for a period of about 2 days. The reaction mixture is then diluted to about 500 ml. with water. The product is isolated after refrigeration and recrystallized from acetone-Skellysolve B (hexanes) to give the desired methoxime. Two recrystallizations from acetone yield pure, light colored 3β-hydroxy-5β-pregnan-20-one 20-methoxime (IIa).

Following the procedure of Example 2, but substituting ethylhydroxylamine hydrochloride or propylhydroxylamine hydrochloride for methylhydroxylamine hydrochloride, yields 3β-hydroxy-5β-pregnan-20-one 20-ethoxime (IIa) or 3β-hydroxy-5β-pregnan-20-one 20-propoxime (IIa).

EXAMPLE 3

*3β-Hydroxy-5β-Pregnan-20-One 20-Methoxime (IIa)*

To 1 g. of 3β-hydroxy-5β-pregnan-20-one (I) in 3 ml. of pyridine is added 1 g. of methoxylamine hydrochloride. The reaction mixture is heated on a steam bath for a period of about 2 days; dilution with water yields the crude methoxime. Recrystallization from acetone-Skellysolve B (hexanes) gives pure 3β-hydroxy-5β-pregnan-20-one 20-methoxime (IIa).

Following the procedure of Example 3, but substituting ethylhydroxylamine hydrochloride or propylhydroxyamine hydrochloride for methoxylamine hydrochloride, yields 3β-hydroxy-5β-pregnan-20-one 20-ethoxime (IIa) or 3β-hydroxy-5β-pregnan-20-one 20 proepoxime (IIa).

EXAMPLE 4

*3β-Hydroxy-5β-Pregnan-20-One 3-Acetate, 20-Methoxime (IIa)*

To 1 g. of 3β-hydroxy-5β-pregnan-20-one 3-acetate (I) (prepared in the manner of Marker et al., J. Amer. Chem. Soc. 59, 1841 [1937]) in 3 ml. of pyridine is added 1 g. of methoxylamine hydrochloride. The reaction mixture is heated on a steam bath for a period of about 2 days; dilution with water yields the crude methoxime. Recrystallization from acetone-Skellysolve B gives pure 3β-hydroxy-5β-pregnan-20-one 3-acetate, 20-methoxime (IIa).

Following the procedure of Example 4, but substituting ethylhydroxylamine hydrochloride or propylhydroxylamine hydrochloride for methoxylamine hydrochloride, yields 3β-hydroxy-5β-pregnan-20-one 3-acetate, 20-ethoxime (IIa) or 3β-hydroxy-5β-pregnan-20-one 3-acetate, 20-propoxime (IIa).

Following the procedure of Example 4, but substituting for 3β-hydroxy-5β-pregnan-20-one 3-acetate (I) another corresponding 3-acylate, yields the appropriate 3β-hydroxy-5β-pregnan-20-one 3-acylate, 20-methoxime (IIa).

EXAMPLE 5

*3β-Hydroxy-5β-Pregnan-20-One 3-Acetate, 20-Oxime (IIa)*

Ten grams of 3β-hydroxy-5β-pregnan-20-one 3-acetate (I) is dissolved in 250 ml. of alcohol and heated at reflux with 3 g. of hydroxylamine hydrochloride and 4 g. of sodium acetate dissolved in 15 ml. of water and warmed for a period of about 1 hour. The reaction mixture is then diluted to a volume of about 500 ml. with water. The product is isolated after refrigeration and recrystallized from acetone-Skellysolve B (hexanes) to give the desired 20-oxime. Two recerystallizations from acetone-Skellysolve B yield pure 3β-hydroxy-5β-pregnan-20-one 3-acetate, 20-oxime (IIa).

Following the procedure of Example 5, but substituting for 3β-hydroxy-5β-pregnan-20-one 3-acetate (I) another corresponding 3-acylate, yields the appropriate 3β-hydroxy-5β-pregnan-20-one 3-acylate, 20-oxime (IIa). Among the 3-esters that can be produced in this manner are those wherein the acyl radical is, for example, that of a lower-hydrocarbon carboxylic acid, such as, a lower-aliphatic acid, e.g., formic, propionic, butyric, isobutyric, valeric, isovaleric, 2-methylbutyric, 3-ethylbutyric, hexanoic, diethylacetic, decanoic, heptanoic, octanoic, undecanoic, a cyclic acid, e.g., cyclopropylideneacetic, a cycloaliphatic acid, e.g., cyclopentylformic, cyclopentylacetic, β-cyclopentylpropionic, β-cyclohexylpropionic, cyclohexylformic, cyclohexylacetic, aryl or aralkyl acid, e.g., benzoic, methylbenzoic, and an aralkyl acid, e.g., phenylacetic acid.

EXAMPLE 6

3β-Hydroxy-5β-Pregnan-20-One 20-Oxime 3,20-Diacetate (IIa)

4 g. of 3β-hydroxy-5β-pregnan-20-one 20-oxime (IIa) (from Example 1) is heated in 8 ml. of pyridine and 6 ml. of acetic anhydride to about 60° C. until the starting material dissolves. The solution is maintained at room temperature for a period of about 2 hours and then quenched with water to give a precipitate which is filtered, washed with water and dried. Recrystallization from a mixture of ether, methylene chloride and Skellysolve B yields pure 3β-hydroxy-5β-pregnan-20-one 3,20-diacetate (IIa).

Following the procedure of Example 6, but substituting for acetic anhydride another lower-hydrocarbon carboxylic acid anhydride, is productive of other 3β-hydroxy-5β-pregnan-20-one 20-oxime 3,20-diacylates (IIa). Among the 3,20-diesters that can be produced in this manner are those wherein the acyl radicals are, for example, those of lower-hydrocarbon carboxylic acids named in Example 5.

EXAMPLE 7

3α-Hydroxy-5β-Pregnan-20-One 20-Oxime (IIa)

Ten grams of 3α-hydroxy-5β-pregnan-20-one (I) (prepared in the manner of Marker et al., J. Amer. Chem. Soc. 59, 1841 [1937]) is dissolved in 250 ml. of alcohol and heated at reflux with 3 g. of hydroxylamine hydrochloride and 4 g. of sodium acetate dissolved in 15 ml. of water and warmed for a period of about 1 hour. The reaction mixture is then diluted to a volume of about 500 ml. with water. The product is isolated after refrigeration and recrystallized from acetone to give the desired 20-oxime. Two recrystallizations from acetone-Skellysolve B (hexanes) yield pure 3α-hydroxy-5β-pregnane-20-one 20-oxime (IIa).

EXAMPLE 8

3α-Hydroxy-5β-Pregnan-20-One 20-Methoxime (IIa)

Ten grams of 3α-hydroxy-5β-pregnan-20-one (I) is dissolved in 250 ml. of alcohol and heated at reflux with 4 g. of methoxylamine (methylhydroxylamine) hydrochloride and 5.5 g. of sodium acetate in 20 ml. of water for a period of about 2 days. The reaction mixture is then diluted to a volume of about 500 ml. with water. The product is isolated after refrigeration and recrystallized frome acetone to give the desired methoxime. Two recrystallizations from acetone-Skellysolve B (hexanes) yield pure, light colored 3α-hydroxy-5β-pregnan-20-one 20-methoxime (IIa).

Following the procedure of Example 8, but substituting ethylhydroxylamine or propylhydroxylamine for methylhydroxylamine, yields 3α-hydroxy-5β-pregnan-20-one 20-ethoxime (IIa) or 3α-hydroxy-5β-pregnan-20-one 20-propoxime (IIa).

EXAMPLE 9

3α-Hydroxy-5β-Pregnan-20-One 20-Methoxime (IIa)

To 1 g. of 3α-hydroxy-5β-pregnan-20-one (I) in 3 ml. of pyridine is added 1 g. of methoxylamine hydrochloride. The reaction mixture is heated on a stream bath for a period of about 2 days; dilution with water yields the crude methoxime. Recrystallization from Skellysolve B give pure 3α-hydroxy-5β-pregnan-20-one 20-methoxime (IIa).

Following the procedure of Example 9, but substituting ethylhydroxylamine hydrochloride or propylhydroxylamine hydrochloride for methoxylamine hydrochloride, yields 3α-hydroxy-5β-pregnan-20-one 20-ethoxime (IIa) or 3α-hydroxy-5β-pregnan-20-one 20-propoxime (IIa).

EXAMPLE 10

3α-Hydroxy-5β-Pregnan-20-One 3-Acetate, 20-Methoxime (IIa)

To 1 g. of 3α-hydroxy-3β-pregnan-20-one 3-acetate (I) (prepared in the manner of Marker et al., J. Amer. Chem. Soc. 59, 1841 [1937]) in 3 ml. of pyridine is added 1 g. of methoxylamine hydrochloride. The reaction mixture is heated on a steam bath for a period of about 2 days; dilution with water yields the crude methoxime. Recrystallization from Skellysolve B gives pure 3α-hydroxy-5β-pregnan-20-one 3-acetate, 20-methoxime (IIa).

Following the procedure of Example 10, but substituting ethylhydroxylamine hydrochloride or propylhydroxylamine hydrochloride for methoxylamine hydrochloride, yields 3α-hydroxy-5β-pregnan-20-one 3-acetate, 20-ethoxime (IIa) or 3α-hydroxy-5β-pregnan-20-one 3-acetate, 20-propoxime (IIa).

Following the procedure of Example 10, but substituting for 3α-hydroxy-5β-pregnan-20-one 3-acetate (I) another corresponding 3-acylate, yields the appropriate 3-hydroxy-5β-pregnan-20-one 3-acylate, 20-methoxime (IIa).

EXAMPLE 11

3α-Hydroxy-5β-Pregnan-20-One 3-Acetate, 20-Oxime (IIa)

Ten grams of 3α-hydroxy-5β-pregnan-20-one 3-acetate (I) is dissolved in 250 ml. of alcohol and heated at reflux with 3 g. of hydroxylamine hydrochloride and 4 g. of sodium acetate dissolved in 15 ml. of water for a period of about 1 hour. The reaction mixture is then diluted to a volume of about 500 ml. with water. The product is isolated after refrigeration and recrystallized from acetone-Skellysolve B (hexanes) to give the desired 20-oxime. Two recrystallizations from acetone yield pure 3α-hydroxy-5β-pregnan-20-one 3-acetate, 20-oxime (IIa).

Following the procedure of Example 11, but substituting for 3α-hydroxy-5β-pregnan-20-one 3-acetate (I) another correpsonding 3-acylate, yields the appropriate 3α-hydroxy-5β-pregnan-20-one 3-acylate; 20-oxime (IIa). Among the 3-esters that can be produced in this manner are those wherein the acyl radical is, for example, that of a lower-hydrocarbon carboxylic acid named in Example 5.

EXAMPLE 12

3α-Hydroxy-5β-Pregnan-20-One 20-Oxime 3,20-Diacetate (IIa)

4 g. of 3α-hydroxy-5β-pregnan-20-one 20-oxime (IIa) (from Example 7) is heated in 8 ml. of pyridine and 6 ml. of acetic anhydride to about 60° C. until the starting material dissolves. The solution is maintained at room temperature for a period of about 2 hours and then quenched with water to give a precipitate which is filtered, washed with water and dried. Recrystallization from a mixture of ether, methylene chloride and Skellysolve B yields pure 3α-hydroxy-5β-pregnan-20-one 3,20-diacetate (IIa).

Following the procedure of Example 12, but substituting for acetic anhydride another lower-hydrogen carboxylic acid anhydride, is productive of other 3α-hydroxy-5β - pregnan - 20 - one 20 - oxime 3,20 - diacylates (IIa). Among the 3,20-diesters that can be produced in this manner are those wherein the acyl radicals are, for example, those of lower - hydrocarbon carboxylic acids named in Example 5.

EXAMPLE 13

*3β-Hydroxy-5β-Pregnan-20-One 20-Ethylene Ketal (IIb)*

10 ml. of ethylene glycol and 200 mg. of p-toluenesulfonic acid was added to 10 g. of 3β-hydroxy-5β-pregnan-20-one (I) in 150 ml. of benzene. This reaction mixture was heated to reflux for a period of about 8 hours and the azeotropically distilled water collected in a Dean-Stark trap. The cooled benzene solution was washed successively with saturated sodium bicarbonate solution, twice with water, saturated sodium chloride solution and dried over sodium sulfate. The benzene was removed under reduced pressure and the residue crystallized from acetone to give 8.4 g. of product having a melting point of 149 to 153° C. Recrystallization from acetone afforded an analytical sample with a melting point of 154.5 to 157.0° C. and an infrared spectrum consistent with the predicted structure of the desired compound, 3β-hydroxy-5β-pregnan-20-one 20-ethylene ketal (IIa).

*Analysis.*—Calcd. for $C_{23}H_{38}O_3$: C, 76.19; H, 10.57. Found: C, 76.09; H, 10.39.

Following the procedure of Example 13, but substituting for ethylene glycol another alkanediol, is productive of other 3β-hydroxy-5β-pregnan-20-one 20-alkylene ketals (IIb). Substitution of propane-1,2-diol, propane-1,3-diol and 3-methyl pentane-1,2-diol for ethylene glycol, yields, respectively, 3β-hydroxy-5β-pregnan-20-one 20-propane-1,2-diol ketal (IIb), 3β-hydroxy-5β-pregnan-20-one 20-propane-1,3-diol ketal (IIb) and 3β-hydroxy-5β-pregnan-20-one 20-(3-methyl pentane-1,2-diol) ketal (IIb).

EXAMPLE 14

*3β-Hydroxy-5β-Pregnan-20-One 3-Acetate, 20-Ethylene Ketal (IIb)*

10 ml. of ethylene glycol and 200 mg. of p-toluenesulfonic acid is added to 10 g. of 3β-hydroxy-5β-pregnan-20-one 3-acetate (I) in 150 ml. of benzene. This reaction mixture is heated to reflux for a period of about 8 hours and the azeotropically distilled water collected in a Dean-Stark trap. The cooled benzene solution is washed successively with saturated sodium bicarbonate solution, twice with water, saturated sodium chloride solution and dried over sodium sulfate. The benzene is removed under reduced pressure and the residue crystallized from acetone. Recrystallization from acetone-Skellysolve B (hexanes) gives pure 3β-hydroxy-5β-pregnan-20-one 3-acetate, 20-ethylene ketal (IIb).

Following the procedure of Example 14, but substituting for ethylene glycol another alkanediol, is productive of other 3β-hydroxy-5β-pregnan-20-one 3-acetate, 20-alkylene ketals (IIb).

Following the procedure of Example 14, but substituting for 3β-hydroxy-5β-pregnan-20-one 3-acetate (I) another corresponding 3-acylate, yields the appropriate 3β-hydroxy-5β-pregnan-20-one 3-acylate, 20-ethylene ketal (IIb). Among the 3-esters that can be produced in this manner are those wherein the acyl radical is, for example, that of a lower-hydrocarbon carboxylic acid named in Example 5.

Treating a 3β-hydroxy-5β-pregnan-20-one 3-acylate (I) with an alkanediol other than ethylene glycol, yields the corresponding 3β-hydroxy-5β-pregnan-20-one 3-acylate, 20 alkylene ketal (IIb).

EXAMPLE 15

*3β-Hydroxy-5β-Pregnan-20-One 20-Ethylene Ketal (IIb)*

10 ml. of ethylene glycol and 100 mg. of p-toluenesulfonic acid is added to 5 g. of 3-α-hydroxy-5β-pregnan-20-one (I) in 100 ml. of benzene. This reaction mixture is heated to reflux for a period of about 18 hours and the azeotropically distilled water collected in a Dean-Stark trap. The cooled benzene solution is washed successively with saturated sodium bicarbonate solution, twice with water, saturated sodium chloride solution and dried over sodium sulfate. The benzene is removed under reduced pressure and the residue crystallized from heptane; yield 4.25 g., melting from 142.0 to 143.5°. Recrystallization from heptane afforded an analytical sample melting from 144.5 to 145.5° C. of 3α-hydroxy-5β-pregnan-20-one 20-ethylene ketal (IIb).

*Analysis.*—Calcd. for $C_{23}H_{38}O_3$: C, 76.19; H, 10.57. Found: C, 76.29; H, 10.53.

Following the procedure of Example 15, but substituting for ethylene glycol another alkanediol, is productive of other 3α-hydroxy-5β-pregnan-20-one 20-alkylene ketals (IIb). Substitution of propane-1,2-diol, propane-1,3-diol and 3-methyl pentane-1,2-diol for ethylene glycol, yields, respectively, 3α-hydroxy-5β-pregnan-20-one 20-propane-1,2-diol ketal (IIb), 3α-hydroxy-5β-pregnan-20-one 20-propane-1,3-diol ketal (IIb) and 3α-hydroxy-5β-20-one 20-(3-methyl pentane-1,2-diol) ketal (IIb).

EXAMPLE 16

*3α-Hydroxy-5β-Pregnan-20-One 3-Acetate, 20-Ethylene Ketal (IIb)*

10 ml. of ethylene glycol and 200 mg. of p-toluenesulfonic acid is added to 10 g. of 3α-hydroxy-5β-pregnan-20-one 3-acetate (I) in 150 ml. of benzene. This reaction mixture is heated to reflux for a period of about 8 hours and the azeotropically distilled water collected in a Dean-Stark trap. The cooled benzene solution is washed successively with saturated sodium bicarbonate solution, twice with water, saturated sodium chloride solution and dried over sodium sulfate. The benzene is removed under reduced pressure and the residue crystallized from acetone. Recrystallization from acetone-Skellysolve B (hexanes) gives pure 3α-hydroxy-5β-pregnan-20-one 3-acetate, 20-ethylene ketal (IIb).

Following the procedure of Example 16, but substituting for ethylene glycol another alkanediol, is productive of other 3α-hydroxy-5β-pregnan-20-one 3-acetate, 20-alkylene ketals (IIb).

Following the procedure of Example 16, but substituting for 3β-hydroxy-5β-pregnan-20-one 3-acetate (I) another corresponding 3-acylate, yields the appropriate 3α-hydroxy-5β-pregnan-20-one 3-acylate, 20-ethylene ketal (IIb). Among the 3-esters that can be produced in this manner are those wherein the acyl radical is, for example, that of a lower-hydrocarbon carboxylic acid named in Example 5.

Treating a 3α-hydroxy-5β-pregnan-20-one 3-acylate (I) with an alkanediol other than ethylene glycol, yields the corresponding 3α-hydroxy-5β-pregnan-20-one 3-acylate, 20-alkylene ketal (IIb).

I claim:

1. 3β-hydroxy-5β-pregnan-20-one 20-alkylene ketals of the formula

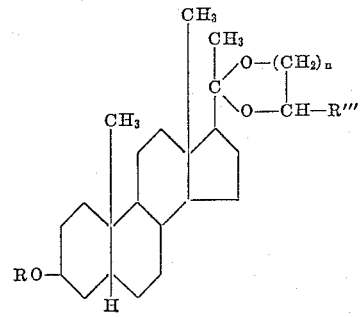

wherein R is selected from the group consisting of hydrogen and the lower-acyl radical of a hydrocarbon carboxylic acid containing from one to eight carbon atoms, inclusive; $n$ is an integer selected from the group consisting of one and two; R''' is selected from the group consisting of hydrogen and a lower-alkyl radical containing from one to six carbon atoms, inclusive.

2. 3β-hydroxy-5β-pregnan-20-one 20-ethylene ketal.

References Cited in the file of this patent

UNITED STATES PATENTS

| | | |
|---|---|---|
| 3,018,285 | Ringold et al. | Jan. 23, 1962 |
| 3,019,243 | Fonken | Jan. 30, 1962 |
| 3,019,244 | Babcock | Jan. 30, 1962 |

OTHER REFERENCES

Buchschacher: "Journal of American Chem. Soc." (1958), vol. 80, pages 2905–2906 relied on.

Panzio: "Anales Real. Soc. Espan. Fisy Quim" (Madrid), 57B—(1961), pp. 298–9 relied on, or Chem. Abstracts 1962, pp. 517(g) to 518(w).